United States Patent
Ma et al.

(10) Patent No.: US 10,438,233 B2
(45) Date of Patent: Oct. 8, 2019

(54) CONVERSION CREDITING

(71) Applicant: Google LLC, Mountain View, CA (US)

(72) Inventors: Sheng Ma, Fair Lawn, NJ (US); Sarah Masters, Brooklyn, NY (US); Fan Zhang, Fair Lawn, NJ (US)

(73) Assignee: Google LLC, Mountain View, CA (US)

( * ) Notice: Subject to any disclaimer, the term of this patent is extended or adjusted under 35 U.S.C. 154(b) by 1621 days.

(21) Appl. No.: 13/963,108

(22) Filed: Aug. 9, 2013

(65) Prior Publication Data

US 2013/0325593 A1    Dec. 5, 2013

Related U.S. Application Data

(63) Continuation of application No. 12/696,202, filed on Jan. 29, 2010, now Pat. No. 8,527,350.

(60) Provisional application No. 61/148,669, filed on Jan. 30, 2009.

(51) Int. Cl.
   *G06Q 30/02* (2012.01)

(52) U.S. Cl.
   CPC ......... *G06Q 30/0246* (2013.01); *G06Q 30/02* (2013.01); *G06Q 30/0247* (2013.01)

(58) Field of Classification Search
   CPC .................................................... G06Q 30/02
   USPC .......................................................... 705/14
   See application file for complete search history.

(56) References Cited

U.S. PATENT DOCUMENTS

| | | | |
|---|---|---|---|
| 2004/0193488 A1 | 9/2004 | Khoo et al. | |
| 2005/0071218 A1* | 3/2005 | Lin | G06Q 30/00 705/14.44 |
| 2005/0125453 A1 | 6/2005 | Rozack | |
| 2006/0041562 A1 | 2/2006 | Paczkowski et al. | |
| 2006/0155728 A1 | 7/2006 | Bosarge | |
| 2009/0024718 A1* | 1/2009 | Anagnostopoulos | G06Q 30/02 709/218 |
| 2009/0037950 A1* | 2/2009 | Ching | H04H 20/103 725/36 |

(Continued)

FOREIGN PATENT DOCUMENTS

| | | |
|---|---|---|
| JP | 2003-256607 | 9/2003 |
| JP | 2003-299122 | 10/2003 |

(Continued)

OTHER PUBLICATIONS

Heck, M. (2005). Chart your web site's success—four web analytics solutions deliver deep analysis of site performance. InfoWorld, 27(8), 6. Retrieved from https://dialog.proquest.com (Year: 2005).*

(Continued)

*Primary Examiner* — Eric R Netzloff
*Assistant Examiner* — Michael R Stibley
(74) *Attorney, Agent, or Firm* — Fish & Richardson P.C.

(57) ABSTRACT

Methods, systems, and apparatus, including computer program products, for processing events related to presented content. In one aspect, a method includes determining a time window count of a number of advertising events associated with an advertisement during at least one time window before a conversion event; and determining a credit that represents a strength of an association between the advertisement and the conversion event, wherein determining a credit includes selecting a weighting model for the at least one time window count.

14 Claims, 10 Drawing Sheets

(56) References Cited

U.S. PATENT DOCUMENTS

| | | | | |
|---|---|---|---|---|
| 2009/0089158 A1* | 4/2009 | Noll | ............ | G06Q 30/02 |
| | | | | 705/14.52 |
| 2009/0327081 A1* | 12/2009 | Wang | ............ | G06Q 30/02 |
| | | | | 705/14.66 |

FOREIGN PATENT DOCUMENTS

| | | |
|---|---|---|
| JP | 2005242429 A | 9/2005 |
| JP | 2006-227817 | 8/2006 |
| JP | 2007-164276 | 6/2007 |
| KR | 2001096391 A | 11/2001 |
| KR | 10-2005-0049750 | 5/2005 |
| KR | 2005109919 A | 11/2005 |
| KR | 10-2009-0000221 | 1/2009 |
| WO | WO2004066176 A1 | 8/2004 |

OTHER PUBLICATIONS

Engage's AdKnowledge reveals startling web advertising results: More conversions come after ad impressions alone than after click throughs. (May 15, 2000). PR Newswire Retrieved from https://dialog.proquest.com (Year: 2000).*

Study reveals that sixty percent of all conversions from online ads occur within the first thirty minutes after a click; AdKnowledge releases Q2 2000 online advertising report. (Jul. 31, 2000). Business Wire Retrieved from https://dialog.proquest.com (Year: 2000).*

DoubleClick: DoubleClick's second quarter ad serving report highlights significance of post-impression metrics in online advertising . . . trends overall mirror global numbers. (Aug. 6, 2004). M2 Presswire Retrieved from: https://dialog.proquest.com; (Year: 2004).*

AdKnowledge introduces advisor—now marketers and agencies can measure web advertising effectiveness. (Oct. 26, 1998). PR Newswire Retrieved from https://dialog.proquest.com (Year: 1998).*

Notice of Allowance issued in Korean Application No. 10-2016-7022631, dated Mar. 31, 2017, 3 pages (with English Translation).

Office Action issued in Canadian Application No. 2751177, dated Feb. 13, 2017, 3 pages.

Notice of Reasons for Rejection for JP 2011-548338 dated Oct. 15, 2013, 4 pages.

Notification of Transmittal of the International Search Report and the Written Opinion of the International Searching Authority, or the Declaration, dated Nov. 30, 2010 for PCT/US2010/022571, 9 pages.

Notification Concerning Transmittal of International Preliminary Report on Patentability for PCT/US2010/025571 dated Aug. 11, 2011, 6 pages.

Event Brief of Q1 2009 Bebe Stores Earnings Conferences Call—Final; Anonymous; Fair Disclosure Wire; pp. n/a; Nov. 6, 2008.

Office Action issued in Korean Application No. 10-2011-7018043 dated Oct. 26, 2015, 13 pages (with English translation).

Office Action issued in Korean Application No. 10-2016-7022631 dated Nov. Oct. 28, 2016, 5 pages (English Translation).

Office Action in Australian Application No. 2010208097, dated Jul. 16, 2014, 3 pages.

Office Action issued in Canadian Application No. 2751177, dated Oct. 26, 2017, 4 pages.

Notice of Reasons for Rejection for Japanese Application No. 2014-145692, dated Feb. 9, 2015, 5 pages (with English translation).

Office Action issued in Canadian Application No. 2751177, dated Oct. 3, 2018, 5 pages.

* cited by examiner

| | Clicks | Cost Per Click | Last Count | Cost Per Last Action | 5 Minutes Count | 1 Day Count | Credit | Cost Per Credit |
|---|---|---|---|---|---|---|---|---|
| Airline | 600 | 0.5 | 10 | $30 | 20 | 70 | 70 | $4.3 |
| ZZ Airline | 700 | 0.5 | 200 | $1.75 | 0 | 0 | 140 | $2.5 |

| | Clicks | Cost Per Click | Last Count | Cost Per Last Action | 5 Minutes Count | 1 Day Count | Credit | Cost Per Credit |
|---|---|---|---|---|---|---|---|---|
| Airline | 600 | 0.5 | 10 | $7.50 | 30 | 100 | 40 | $7.14 |
| ZZ Airline | 700 | 0.5 | 200 | $1.75 | 200 | 200 | 170 | $1.94 |

CONVERSION CREDITING

CROSS-REFERENCED TO RELATED APPLICATIONS

This application is a continuation of U.S. patent application Ser. No. 12/696,202, filed on Jan. 29, 2010, entitled "Conversion Crediting," which claims the benefit under 35 U.S.C. § 119(e) of U.S. Provisional Patent Application No. 61/148,669, titled "Conversion Crediting," filed Jan. 30, 2009, the disclosures of which are incorporated herein by reference.

TECHNICAL FIELD

This instant specification relates to processing events related to presented content.

BACKGROUND

For some consumers, the Internet has replaced traditional media such as newspapers and radio as their primary source of information and entertainment. Accordingly, advertisers have spent increasing amounts of time and money to promote their goods and services online. For example, advertisers have generated various forms of online advertisements to reach consumers: pop-up advertisements that can appear in a separate window when a web browser visits a webpage; banner advertisements that may direct a web browser to an advertising site when a user clicks, for example, on a image associated with the ad; and search advertisements that are displayed with search results, to name a few.

Advertisers can track a variety of attributes (i.e., data) related to advertisements. Of particular interest to advertisers are a number of impressions (i.e., displays) or clicks associated with an advertisement. Impressions, clicks, and other types of advertisement-related data are commonly referred to as advertising events. Advertisers are also interested in business activities that stem from an advertisement. These business activities, referred to as conversions, can include an action that an advertiser wants a consumer to perform, e.g., a product purchase or website registration. Data associated with business activities is generally referred to as a conversion event.

To increase the return on their advertising outlays, advertisers try to determine how likely an advertisement is to result in a conversion. For example, a consumer may encounter numerous search and banner advertisements promoting a product before deciding to purchase the product. It may be unclear to an advertiser how heavily each advertisement influenced the consumer's purchase decision.

SUMMARY

In general, this document describes systems and techniques for determining how much an advertisement contributed to an occurrence of a business activity. In some implementations, one or more intervals can be selected and a number of advertising events within the selected intervals can be determined. The resulting numbers may be used to determine a measure of a causal or association relationship between an advertisement and a business activity. For example, a series of time windows can be determined based in part upon a change over time in a probability that an advertisement will lead to a conversion. One or more time window counts may be determined by counting a number of advertising events within each window. The time windows counts can be adjusted by a weighting model that, in some cases, produces weighting factors that exponentially decrease in magnitude with time. The resulting weighted time window counts can be summed to a produce a credit that represents an advertisement's contribution to a business activity. The credit may be normalized such that a number of credits for one or more advertisements can be equivalent to a number of conversions associated with the one or more advertisements.

In general, one aspect of the subject matter described in this specification can be embodied in methods that include the actions of determining at least one time window count by determining a number of advertising events associated with an advertisement during at least one time window before a conversion event; multiplying the at least one time window count by a weighting factor to generate at least one weighted time window count; and summing the at least one weighted time window count to determine a credit that represents a strength of an association between the advertisement and the conversion event. Other embodiments of this aspect include corresponding systems, apparatus, and computer program products.

Another aspect of the subject matter described in this specification can be embodied in a system that includes a statistics module that determines at least one time window count by determining a number of advertising events associated with an advertisement during at least one time window before a conversion event; and a modeling module that multiplies the at least one time window count by a weighting factor to generate at least one weighted time window count and sums the at least one weighted time window count to determine a credit that represents a strength of association between the advertisement and the conversion event. Other embodiments of this aspect include corresponding systems, apparatus, and computer program products.

Another aspect of the subject matter described in this specification can be embodied in a method the includes the actions of determining a time window count of a number of advertising events associated with an advertisement during at least one time window before a conversion event; and determining a credit that represents a strength of an association between the advertisement and the conversion event, wherein determining a credit includes selecting a weighting model for the at least one time window count. Other embodiments of this aspect include corresponding systems, apparatus, and computer program products.

The systems and methods described here may provide one or more of the following advantages. First, a system can decrease the computational complexity of determining the efficacy of advertisements. Second, a system can present information regarding advertising efficiency in a format that may be easy to understand and interpret. Third, a system can permit real-time changes to a weighting model.

The details of one or more embodiments of the invention are set forth in the accompanying drawings and the description below. Other features and advantages of the invention will be apparent from the description, drawings, and claims.

DESCRIPTION OF DRAWINGS

FIGS. 3A and 3B show tables that illustrate example conversion crediting statistics for advertisements.

Like reference symbols in the various drawings indicate like elements.

DETAILED DESCRIPTION

This document describes systems and techniques for determining how much an advertisement contributed to the occurrence of a conversion. In some implementations, one or more periods before a conversion can be identified. A number of advertising events in the selected periods can be tallied and weighted. These weighted quantities can be summed and normalized to calculate an attribution value for an advertisement. The attribution value may be a measure of how much an advertisement attributed to a conversion; i.e., the strength of an association between an advertisement and a conversion.

Figure 1:
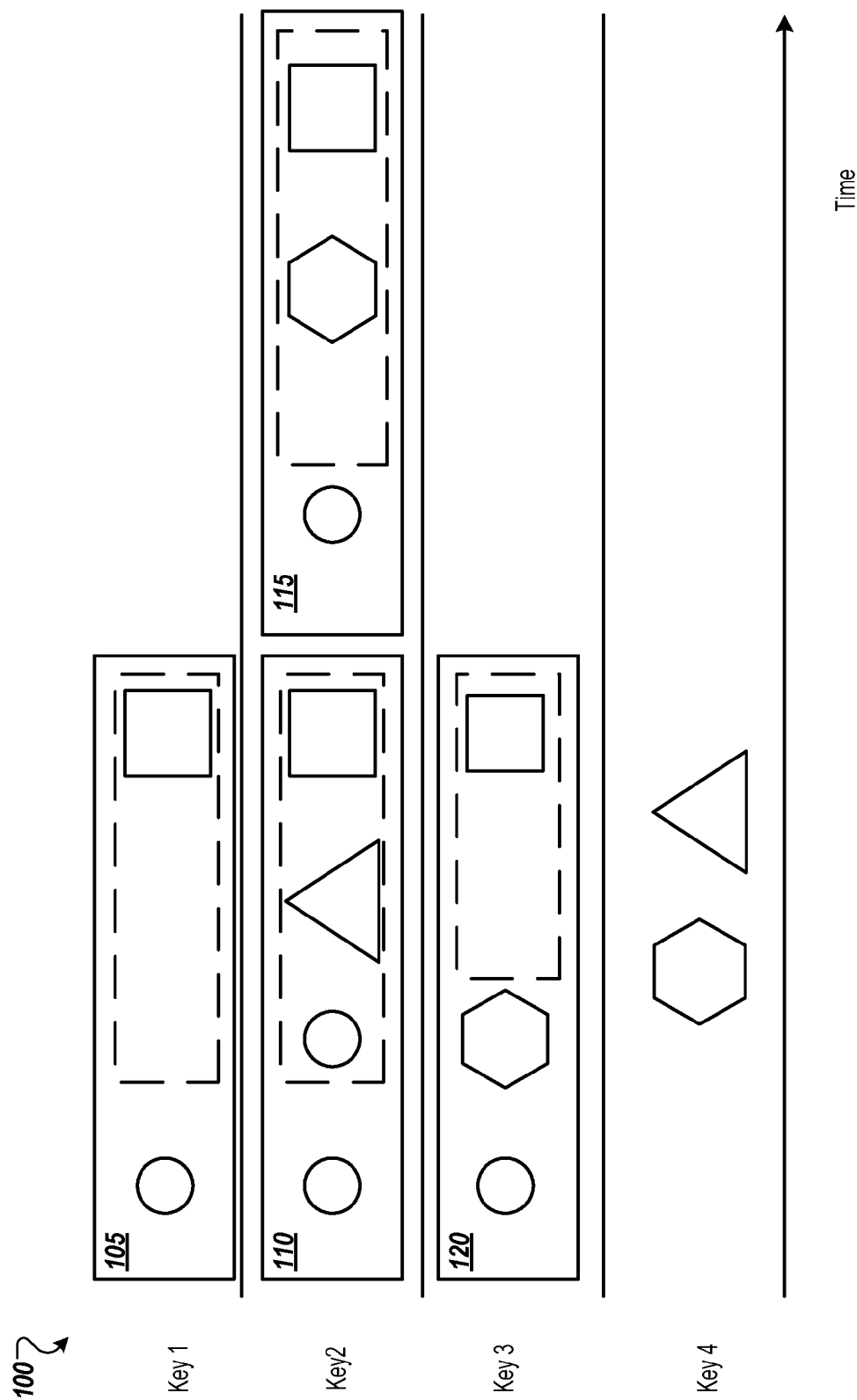
FIG. 1 is a conceptual diagram of conversion crediting.

FIG. 1 is a conceptual diagram 100 of conversion crediting. The illustrative diagram 100 shows events—symbolized by circles, triangles, hexagons, and squares in the diagram 100—associated with advertisements and conversions. For example, circles can represent a click on a display advertisement (e.g., a banner ad); triangles can represent a click on an advertisement displayed as a result of a search involving a specified keyword (referred to as a "search click"); hexagons can represent impressions; and squares can represent conversion events (e.g., a ticket purchase). The illustrative diagram 100 depicts the events grouped according to an event key (which can be mapped to one or more event attributes as discussed below) and placed in chronological order within their respective groups. As discussed in greater detail below, the illustrative event model may allow a conversion crediting system to incorporate various event types and perform different kinds of analyses.

In some cases, a data structure referred to as an event data structure can be defined to facilitate processing the events shown in FIG. 1. The event data structure can be used for storing data related to events and modeling events. An event data structure may include a timestamp, an event identifier, and a key. A timestamp can indicate when an event took place, while an event identifier can indicate a type of event. For example, an event identifier may specify an advertisement placement (e.g. an ad placement on a webpage), an advertisement creative (i.e., the content of an advertisement such as an image), an advertiser associated with the advertisement, or, if the event is a conversion, a conversion type. In some cases, an event identifier may include a plurality of event attributes. For example, an event identifier may specify both an advertisement placement and an advertiser linked to the advertisement.

A key for an event data structure may include one or more event attributes that can be used to separate events into groups. In the example illustrated in the diagram 100, the keys for the depicted events may represent both user identifiers and the associated conversion type. The illustrative identifiers may denote a user interaction with an advertisement (e.g., clicking on an advertisement) or that the advertisement has been displayed on a webpage requested by the user. In this example, the keys allow the events to be divided into groups of advertisements that either have been displayed or have been clicked by the same user. In some cases, an event data structure may have multiple keys. For example, an online advertisement clicked on by multiple users may include a different key for each user.

The depicted events may include advertising events that can specify information related to an advertisement such as an advertisement type, when an advertisement was displayed, or who saw the advertisement. An advertising event may also specify other advertisement attributes, e.g., advertisement size, key words associated with an advertisement, or context (e.g., a display location in a webpage for an advertisement), among other things. The depicted events may also include conversion events, which can contain, inter alia, data relating to business activities. For instance, a conversion event may indicate who purchased a product or registered with a website.

The illustrative diagram 100 also shows a number of transactions. In general, a transaction can include one or more advertising events that share a key and include a conversion event that signifies the end of the transaction. For example, the top-most rectangle 105 in the diagram 100 encompasses an illustrative transaction. The example transaction includes an advertising event and a conversion event with Key 1 in common. Similarly, the rectangles 110 and 115 associated with Key 2 highlight transactions that include events that share the Key 2 key. The remaining rectangle 120 indicates a fourth transaction that includes events that have Key 3 in common. Because, in this example, the series of events associated with Key 4 do not include a conversion, there is no transaction in the Key 4 group.

The conceptual diagram 100 can represent users' online activity. In this example, the diagram 100 represents four users' exposure to, and interaction with, advertisements. The advertisements can be either "display" or "search" advertisements. Display advertisements are advertisements displayed to a user when the user visits a webpage. For example, banner advertisements presented when a user visits a news website or web portal are display advertisements. Search advertisements, on the other hand, are advertisements that are displayed with search results.

In the current example, the users may be interested in information relating to flights for an upcoming trip. The users may navigate, for example, to a news website and see an advertisement paid for by ZZ Airline. These advertising impressions are represented by circles in the diagram 100. The users may also search for flight information by entering the term "Airline" into a search module. The results returned by the search module can include advertisements related to the search term paid for by ZZ Airline. Such sponsored search advertisements are represented by the hexagons in the diagram 100.

After reviewing the search results, some of the users may decide to adjust their search queries. For example, some users may enter the words "ZZ Airline" into their respective search modules. The ensuing search results can include an advertisement that may direct the users to the ZZ Airline website. These impressions are symbolized by the triangles in the diagram 100. Some users may choose to click on the link to the ZZ Airline website and book a flight; these conversions are represented by the squares in the diagram 100.

The scenario discussed above is one of numerous scenarios that can be represented using the illustrative conversion crediting system. For example, in some cases, the shapes shown in FIG. 1 can represent search clicks or impressions associated with a search (i.e., "search impressions"). For instance, the circles can represent search clicks associated with the "Airline" and hexagons can represent a search click associated with "ZZ Airline," while triangles can represent impressions associated with "Airline." In other situations, the shapes can represent impressions and clicks that are not associated with a search (e.g., display advertisements). For example, advertisements sponsored by ZZ Airline that are displayed on a web portal may fall into this category. In some cases, the shapes can represent a combination of search impressions, search clicks, and non-search impressions and clicks.

These examples of Internet advertisements are merely illustrative; data associated with other media channels such as e-mail, video, radio, or television, among other type of media, may be represented by the illustrative conversion crediting system. For example, the mapping mechanism discussed below in regards to FIG. 4 may be used to represent data from different media sources in the same analysis, thereby allowing cross-channel media analysis.

Some of the advertising and conversion events described above may fall within one or more time windows, which are represented in the diagram 100 by rectangles with solid and dashed lines. As will be discussed further below, time windows may be used to determine an attribution value (referred to as a credit) for an advertisement.

In some implementations, a time window can comprise a time interval before a conversion. In some cases, a time window can be a fixed size. For example, a time window may be 1 hour, 12 hours, 1 day, 2 days, 5 days, 10 days, 20 days, etc., in duration. In other cases, the length of the time interval for a time window may be dynamically selected. For example, the length of the time interval can be based upon a rate of change of a time-to-conversion profile. In some cases, a time-to-conversion profile can be represented by a curve indicating the probability that an advertising event will lead to a conversion. For example, if this curve changes fairly rapidly in a particular time period, time windows having a relatively short duration may be used. By contrast, if the curve is comparatively steady in a given period, the selected time windows may have a relatively long duration. Time-to-conversion profiles are discussed in further detail in regards to FIG. 2.

In this example, the rectangles with dashed lines represent time windows that are five minutes long, while the rectangles with solid lines mentioned above in regards to transactions also symbolize time windows that are ten minutes in duration.

In the illustrative example, a window count may be determined by counting a number of advertising events within the depicted windows. In some cases one of multiple window counting methods can be used. For example, consider the advertising events represented by circles in the diagram 100. One of these advertising events appears in the five-minute time windows and five of these events appear in the ten-minute windows, leading, in this example, to time windows counts of one for the five-minute window and five for the ten-minute window.

In some cases, events that fall within more than one time window can be counted more than once. For example, one of the circles shown in FIG. 1 is included in both a ten-minute and a five-minute time window. In the above example, that circle was counted in both the five- and ten-minute time window counts. In a second method of determining window counts, events that fall within multiple windows may be counted just once. In some cases, events that are included in an earlier (or smaller) time window may not be counted in a subsequent (or larger) time window. For example, when determining the number of events within the ten-minute window, events that also fall within the five-minute window may be discounted, resulting, in this example, in a ten-minute window count of four and a five-minute count of one.

Other time windows may be used. For example, a "last count" time window can be used to count the number of advertising events that are regarded as the last advertising event before a conversion. In the current example, the last count for events represented by circles is one, as only the upper-most window 105 includes a circle that is the last advertising event before a conversion.

In some cases, a weighting model may be applied to window counts. In the illustrative example, the five- and ten-minute window counts may be multiplied by a weighting model that, in some cases, exponentially decreases with time. In other cases, the weight model can be uniform and drop to zero at specified time. In some circumstances, the weighting model can be a custom weighting model created by a user. For example, the weighting model can follow a piece-wise curve generated by the user. The weight may have a starting value of 1 that progressively declines to 0.5 by the end of a first day. The weight then gradually changes from 0.5 to 0.3 at the end of a week and then again progressively declines to 0 at the end of two weeks. In some cases, the curve may be a step function. For example, the weight value may be 0.5 for the first day, drop to 0.3 for the next week, and then drop to zero at two weeks.

The resulting weighted time window counts may be summed and normalized to produce a credit for the advertisement. For example, the tallied and weighted window counts may be multiplied by a normalization factor that may allow a total number of credits for one or more advertisements to equal a total number of conversions associated with those advertisements.

Figure 2:
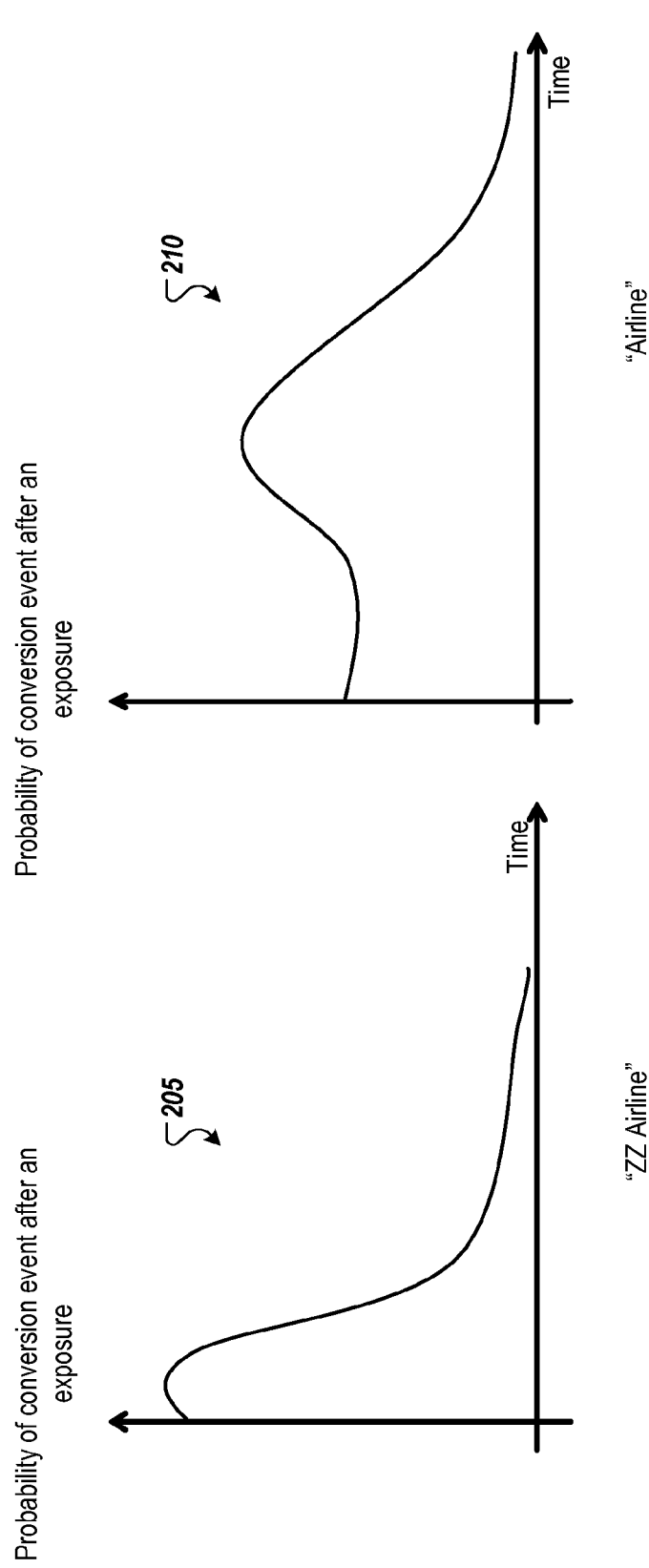
FIG. 2 illustrates example time-to-conversion profiles.

FIG. 2 illustrates example time-to-conversion profiles 200. In some implementations, the illustrative profiles 200 can indicate the effectiveness of an advertisement over time. For example, a time-to-conversion profile can represent a change over time in the probability of a conversion event after an advertising event. In some cases, this probability may be calculated by dividing a total number of advertising events before a conversion in specified time windows by an average number of advertising events within those time windows. That is, the probability may be represented by the following formula:

$$P(Conv|ad, \tau) = \frac{count(conv, ad, \tau)}{count(ad, \tau)}$$

Here, count (conv, ad, τ) equals the number of advertising events (i.e., events where the event identifier for indicates that event is an advertisement) that occur within a time window τ before a conversion (denoted by conv), and count (ad, τ) represents an average number of advertising events in a time window τ.

The illustrative profiles may allow an advertiser to determine whether an advertisement may be considered direct or brand-awareness in nature. A direct advertisement (e.g., a coupon) is an advertisement that leads to a conversion relatively soon after an advertising event, e.g., in a few hours. An example time-to-conversion profile for a direct advertisement is shown by a profile 205 for an advertisement connected to the search term "ZZ Airline." A brand-awareness advertisement communicates the brand message. Therefore, a brand-awareness advertisement may lead to a conversion after a comparatively longer period, for example a few a days or sometimes as long as one to three months. For example, a brand-awareness advertisement profile is shown by the right-most profile 210 for an advertisement related to the search query "Airline."

In some cases, advertisers may select an advertisement based on the time-to-conversion profile for an advertisement. For example, if an advertiser is trying to increase a number of conversions in a relatively short period, the advertiser may choose a direct advertisement. If, however, an advertiser is aiming to increase brand awareness, which can take more time to result in a conversion, the advertiser may select a brand-awareness advertisement.

FIG. 3A is a table 300 that illustrates example conversion crediting statistics for advertisements. The illustrative table 300 includes example statistics regarding the "Airline" and "ZZ Airline" search advertisements. The table 300 includes a number of clicks and a cost per click for each advertisement. The table 300 also includes a last count for each advertisement. As discussed above, the last count is a number of times an advertisement was the last advertisement displayed before a conversion associated with the advertisement. Thus, in this example, the last count window also represents the number of conversions. In addition, the table 300 also includes data regarding a cost per last action, and information relating to window counts for a five-minute time window and a one-day time window. Finally, the illustrative table 300 includes information regarding a credit and a cost per credit (i.e., cost effectiveness) for each advertisement.

In the example summarized in the table 300, the cost per click for both terms is the same: 50 cents. However, in this example, the last count for the "ZZ Airline" advertisement is 20 times the last count for "Airline" advertisement, resulting in costs per last count of $30 and $1.75, respectively. The cost per last action in this example may represent a cost per conversion for an advertisement. Given these costs per last counts, advertisers may believe that spending most, if not all, of their advertising budget on the "ZZ Airline" search advertisement may result in the greatest return on their advertising investment. For example, an advertiser's budget may permit the advertiser to spend as much as $5 per conversion. In this example, as the cost per last count for the "Airline" search advertisement is $30 per conversion, the advertiser may choose to purchase "ZZ Airline" search advertisements because, at $1.75 per conversion, this advertisement is within the advertiser's budget.

In some cases, the last count for an advertisement may not accurately reflect an advertisement's contribution to a conversion. For example, as noted in regard to FIG. 2 above, direct advertisements may lead to a conversion rather quickly, while the impact of brand-awareness advertisements may take longer to become apparent. Credits generated by the illustrative conversion crediting system may more accurately reflect the causative effects of these brand-awareness advertisements because, in some cases, a credit may reflect advertisements beyond the last advertisement displayed before a conversion.

For example, the last count methodology described above may discount the "Airline" search advertisement because it was used during an early phase of a user's decision-making process. For example, the "Airline" advertisement helped a user choose ZZ Airline and eventually buy a ticket from ZZ Airline. Considering only the number of last counts for each advertisement would not reflect the contribution the "Airline" search advertisement made to the eventual conversion.

For instance, the table 300 shows five-minute and one-day window counts for both of the example search advertisements. As shown in the table, although the "ZZ Airline" advertisement produced more last counts than the "Airline" advertisement, the "ZZ Airline" advertisement was not displayed within one day of any conversion. By contrast, the "Airline" advertisement was shown 70 times within one day of a conversion, and 20 times within 5 minutes of a conversion. In the current example, a credit for these advertisements may be generated by multiplying the last, five-minute, and one-day counts for each advertisement by a weighting factor and summing the resulting weighted time window counts. For example, a weighting factor may be generated using the following weighting model:

$$w_j = e^{-c*\tau_j} \tag{1}$$

In this equation, c can control the decay rate of the weighting function, e can be a base of a natural logarithm, and τ may be a time for a window count j.

In this example, the time window counts may discount events that fall within more than one time window. For example, the last, five-minute, and one-day count columns may represent time windows that overlap with one another. In the illustrative example, events counted in a previous column (here, a column to the left of the column in question) are not counted again. Thus, events counted in the last count column will not be counted in the five-minute count column, and events that have been counted in either of these columns will not be counted in the one-day count column.

In this example, the weight scheme may be "equal weights"; i.e., the weights for each window count may be the same. In the current example, the weight for each window count is one. Summing the time window counts for each search term and multiplying the time window counts by their weighting factor results in time window counts of 100 and 200, respectively, for the search advertisements "Airline" and "ZZ Airline."

These counts may be used to determine a normalization factor that, in turn, can be used to calculate a credit. For example, the ratio of the total number of last counts (here, 210) and the sum of the counts for the terms "Airline" and "ZZ Airline" (300 in this example) equals the normalization factor. Thus, here the normalization factor is 0.7 (210/300). Multiplying the weighted window counts by this normalization factor results in credits of 70 and 140, respectively, for the "Airline" and "ZZ Airline" search advertisements. Multiplying the weighted window counts by the normalization factors makes the total credits for the advertisements (in this example, 210) equal the total number of conversions associated with the advertisements (here, 210).

The cost per credit equals the total cost (here, the total number of clicks multiplied by the cost per click) divided by the total credit. In this example, the calculated credits may lead to costs per credit of approximately $4.3 ((600*0.5)/70) and $2.5 ((700*0.5)/140), respectively, for the "Airline" and "ZZ Airline" search advertisements. The cost per credit for these advertisements may lead an advertiser with a budget of $5 per conversion to split his advertising budget proportionally between the "Airline" and "ZZ Airline" search advertisements.

In the above example, events that fell within more than one time window were counted only once. However, the same process can be used to calculate a credit for advertisements when events that are within more than one time window are counted more than once. For example, consider FIG. 3B. The figure shows another table 350 that contains illustrative statistical information regarding the "Airline" and "ZZ Airline" search advertisements. In this example, events that fall within one time window can be counted in other time windows. For example, consider the row labeled "Airline" in FIG. 3B. The 10 events that fall within the last count time window can also be counted in the five minute and one day count windows.

The process for determining a normalized credit is the same as the process described in regards to FIG. 3A. Window counts for the search advertisements are generated by summing the last count, five-minute, and one-day windows, resulting in time window counts of 140 and 600, respectively, for "Airline" and "ZZ Airline." The time window counts can be used to determine a normalization factor by, for example, dividing the total number of last counts by the total number of window counts, resulting in a normalization factor of approximately 0.284 (210/740).

These time window counts can be multiplied by a weighting factor to determine weighted time window counts. As in the previous example, the weighting scheme may be equal weight and the weight for each time window may be one. This results in the weighted time window counts that equal the time window counts. The weighted time window counts can be multiplied by the normalization factor generate a credit of 42 for the "Airline" search advertisement and 180 for the "ZZ Airline" search advertisement. The cost per credit may also be determined as described above, namely dividing a total cost (here, total number of clicks multiplied by the cost per click) by the credit. Doing so results in cost per credits of approximately $7.14 and $1.94, respectively, for the "Airline" and "ZZ Airline" search advertisements.

Figure 4:
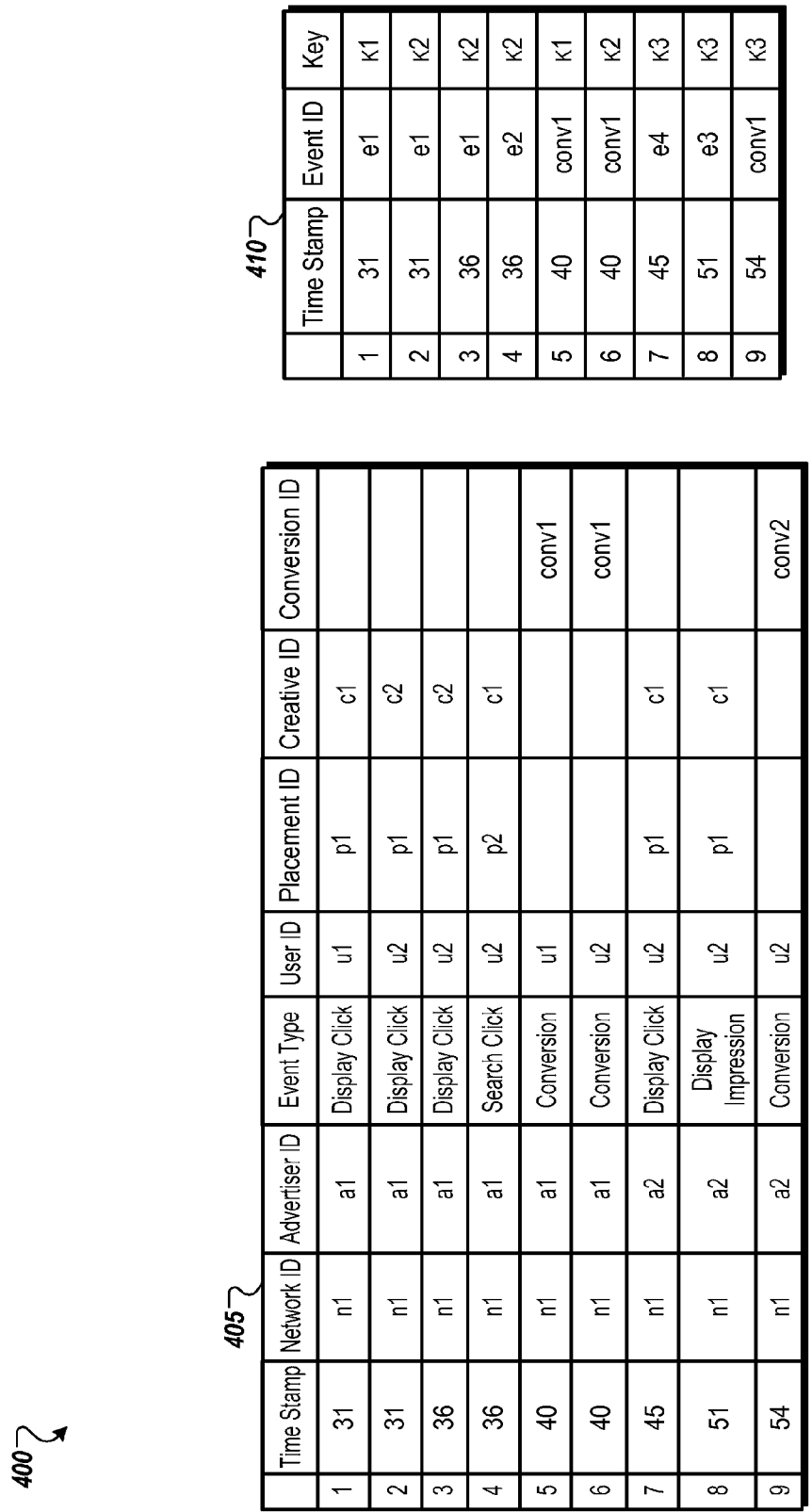
FIG. 4 is a conceptual diagram of event mapping.

FIG. 4 is a conceptual diagram 400 of event mapping. In some cases, application-specific information related to an event may not be modeled in the event data structures mentioned above. In some implementations, this application-specific information may be mapped to an event model. The event mode defines a mapping process may allow a conversion crediting system to process numerous event types. For example, table 405 illustrates events that include information that, in some cases, may not be included in an event data structure, e.g., network, user, advertiser, and placement identifiers, to name a few. The application-specific event information may be mapped to the elements of an event data structure, illustrated in the right-most table 410 in FIG. 4. For example, the timestamp and user identifier for the application-specific events can be mapped to the timestamp and key, respectively, for the corresponding event data structures. The event type for the application-specific events can also be mapped to the event identifier for the event data structure.

In some cases, the mapping scheme used will depend on the goal of the conversion crediting analysis. For example, a user may want to determine the credit for each advertisement placement by an advertiser. This type of analysis may result in the event type, placement, conversion, and advertiser identifiers shown in the table 405 being mapped to the event identifiers in table 410, while the user and advertiser identifiers in table 405 are mapped to the keys in table 410.

If a user wants to determine the credit for each advertisement creative for an advertiser, the event type, creative, conversion, and advertisers identifiers shown in table 405 may be mapped to the event identifier column in table 410. Simultaneously, the user and advertiser identifiers in table 405 may be mapped to keys in table 410.

Figure 5:
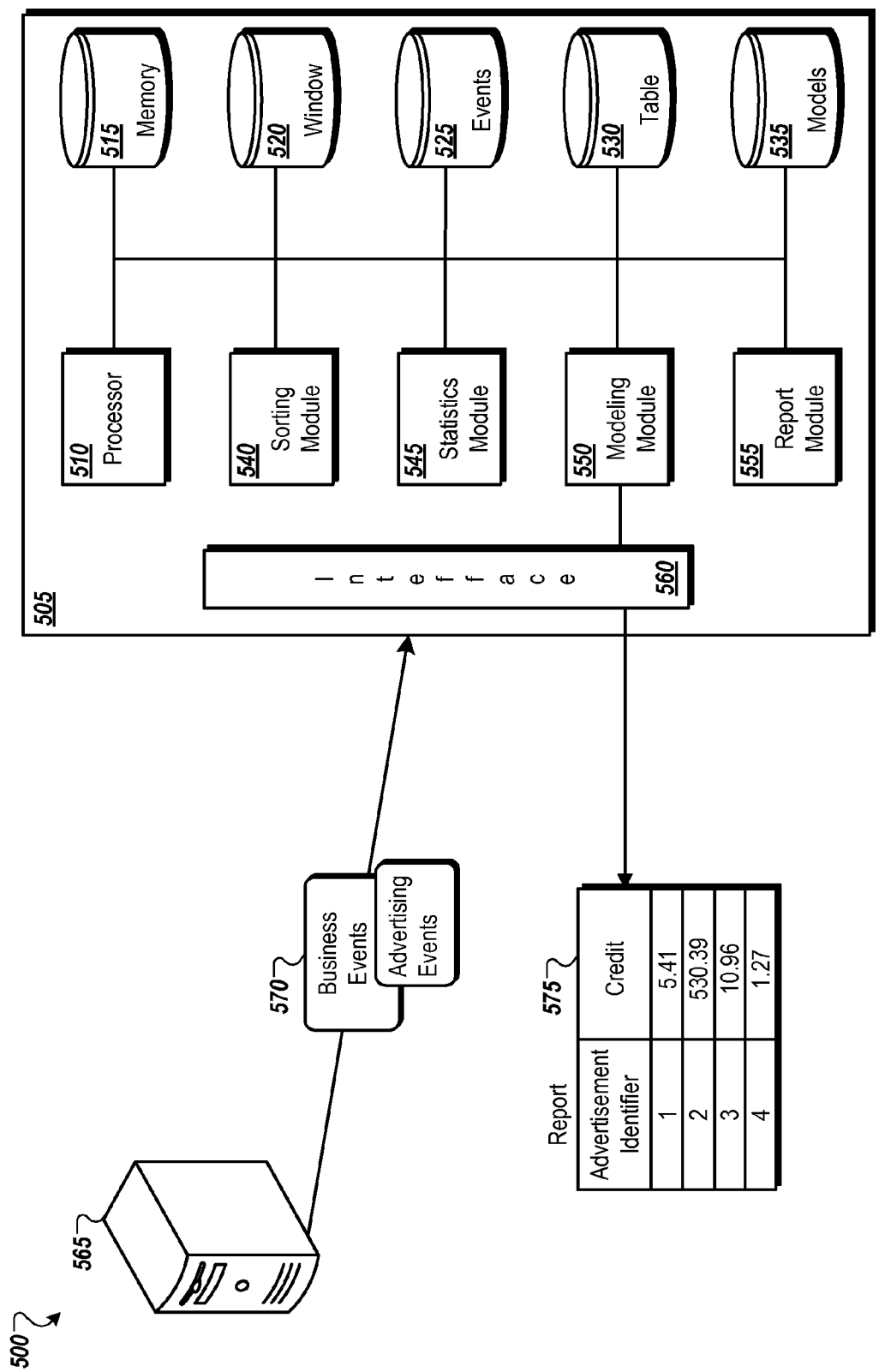
FIG. 5 is a block diagram of an example conversion crediting system.

FIG. 5 is a block diagram 500 of an example conversion crediting system 505. The example system 505 can include a processor 510 for executing instructions stored in memory 515. For example, memory 515 may contain instructions that, when executed by the processor 510, control the system 505. Memory 515 may also store other data related to the system 505 such as time windows, weights, events, tables, time-to-conversion profiles, weighting models, weighted time window counts, and information related to transactions, among other types of data.

The system 505 can also include other data repositories. For example, the system 505 can include a window database 520 that may contain data regarding time windows. For example, the window database 520 may include information regarding time window sizes (i.e., the length of a time window), a number of windows for a particular event model, and window counts, among other things.

The system 505 may also include an event repository 525. The illustrative event repository 525 can contain events such as the advertising and conversion events described above. The event repository 525, in some applications, may also contain an event model that can be used to map events into a common format, e.g., a format of the event data structure. In some cases, the event repository 525 may include an event cache that can be used to process events in real-time, as described in regard to FIG. 6 below.

In addition to the databases and repositories listed above, the system 505 may also contain table and model databases. The table database 530 can contain tables that, in some implementations, include conversion and advertising events. The model database 535 can contain weighting models and weighting factors that may be used to calculate a credit for advertisements. For example, the model database 535 may contain a series of weighting functions that correspond to equation (1) above.

The illustrative system 505 may also include a sorting module 540. A sorting module can, in some cases, sort received events and load them into a table. For example, a computing system 565 such as an advertising server may transmit a collection of events 570 to the system 505. The sorting module may load the received events into a table and sort the events by, for example, a key or event identifier. In some cases, the events may be sorted into one or more transactions. The sorting module may further sort the events by timestamp. For example, the sorting module may sort the events in chronological order using the events' timestamp. The resulting table may be stored in table repository 530.

In addition to the sorting module 540, the system 505 may contain a statistics module 545. The statistics module 545 can analyze event information to calculate data that may be used to determine credits. For example, the statistics module 545 may determine temporal statistics such as time window counts and time-to-conversion profiles. For example the statistics module 545 may generate a time-to-conversion profile for an advertisement by dividing a number of times an associated advertising event has occurred before a conversion event in a specified interval by an average number of advertising event occurrences in the specified time interval. The statistics module 545 may, in some implementations, calculate other statistics related to advertisements such as total clicks or total impressions, cost per click or impression, etc. The module 545 may also compute statistics related to credits. For example, the module 545 may calculate a cost per credit and changes in credits or cost per credits over time. In some cases, the statistics module 545 may determine a cost per credit of an advertisement by dividing a cost of an advertisement by a normalized credit for the advertisement. The statistics module 545 may store some or all of this information in any appropriate database, e.g., window database 520, event database 525, or memory 515.

In some implementations, the statistics module 545 may transmit some or all of these temporal statistics to a modeling module 550 that may use the statistics to generate credits. In some cases, the modeling module 550 may generate a weighting model for an advertisement like the model described above in equation (1), or the modeling module 550 may retrieve a model from the model repository 535. The modeling module 550 may also, for example, use a weighting model to calculate a normalized credit according to the following equation:

$$\sum \frac{w_j * c_j}{N} \quad (2)$$

In this equation, $c_j$ can be a $j^{th}$ window count, $w_j$ can be a weighting factor for the $j^{th}$ window count that may be calculated according to equation (1) above, and N may be a normalization factor that, in some cases, may make a total number of credits for one or more advertisements equal a total number of conversions associated with those advertisements. The modeling module 550 may store the resulting credits in memory 515, send the credits to a reporting module 555, or, in some cases, do both.

The reporting module 555 may generate a report 575 that details, among other things, the effectiveness of an advertisement. In some cases, a report may contain, for example, information such as network, advertiser, and advertisement identifiers, a number of advertising events and conversions, time window counts, weighting factors, and a credit for an advertisement. A report may also contain a previous credit for an advertisement and a percent change in an advertising credit over a given period. A report may also list bids, clicks, clicks per impression, cost per click, cost per credit for an advertisement, etc. A report may be transmitted to a remote computer or stored in memory 515.

The system 505 can also include an I/O interface 560. The I/O interface 560 can communicate with other devices and systems over a communications network such as the Internet. The I/O interface 560 can also allow the system 505 to communicate with peripheral devices such as keyboards and displays connected to the system 505 or communicate with remote devices such as an advertisement server 565. These peripheral devices may allow a user to view and modify parameters such as the weighting models and weights for different events. The user may use a graphical user interface to enter and store such data in an appropriate repository such as the memory 515, window 520, or model 535 databases.

Figure 6:
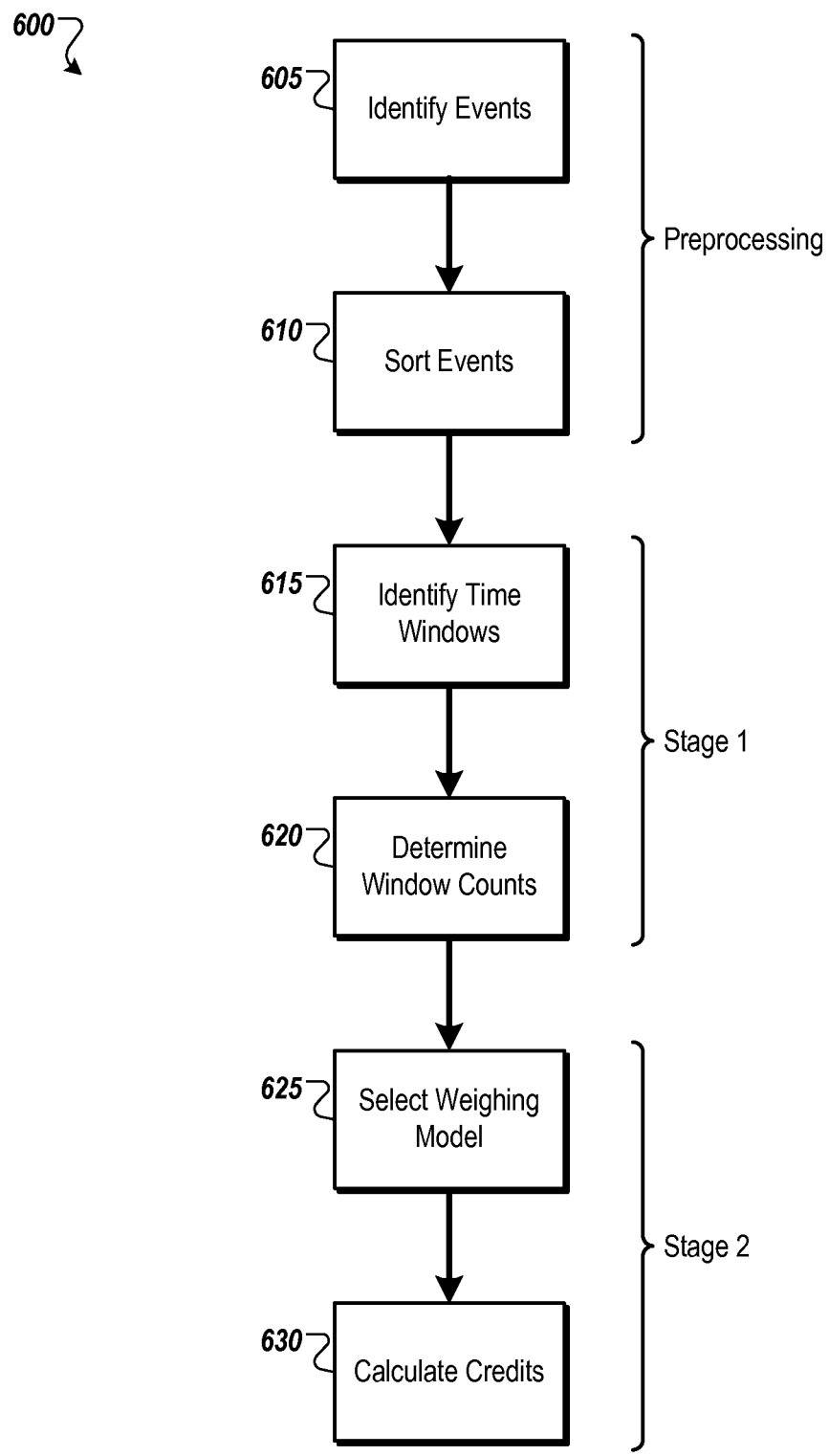
FIG. 6 is an example process of conversion crediting.
Figure 7:
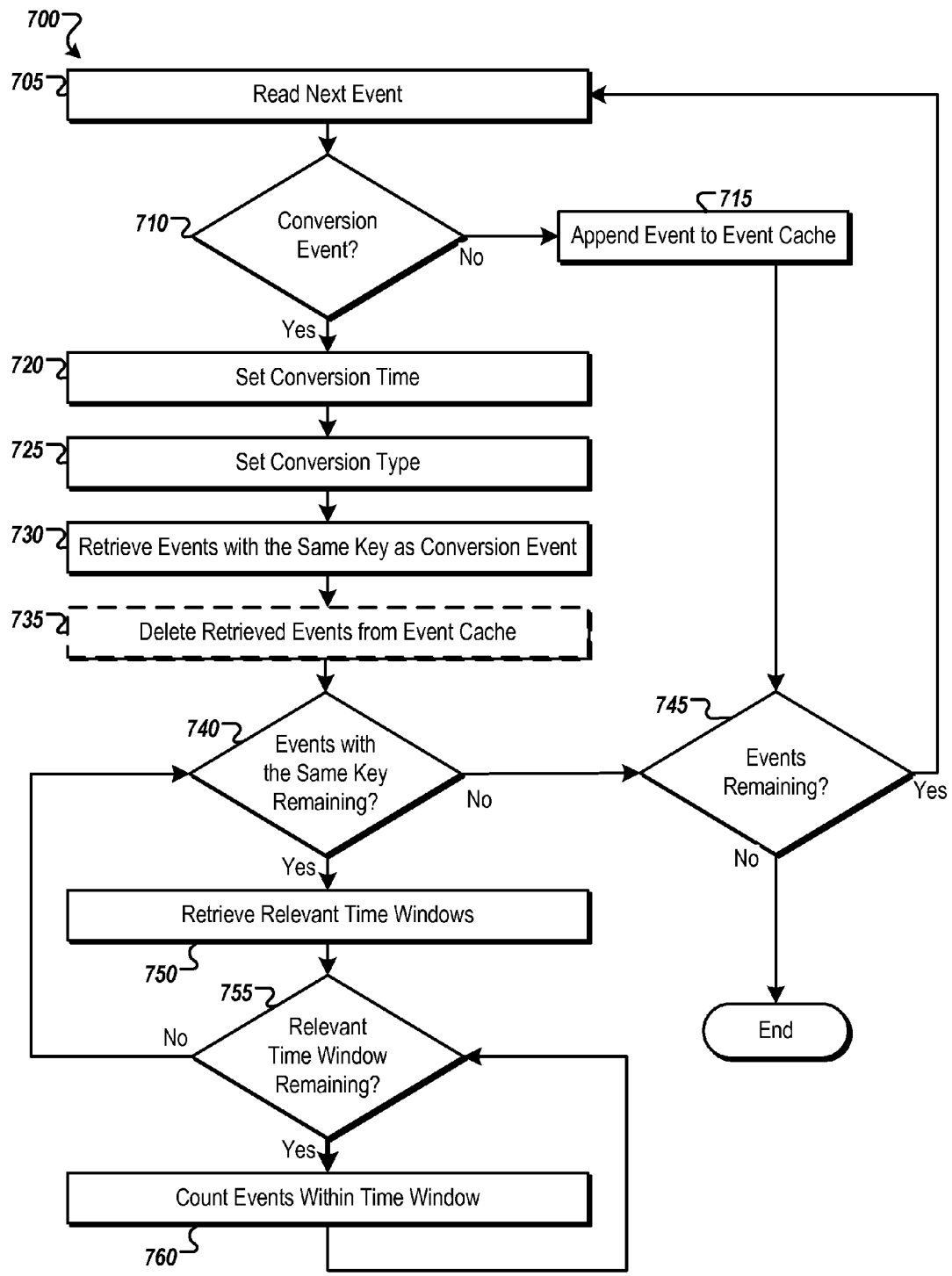
FIG. 7 is an example process of determining time window counts.
Figure 8:
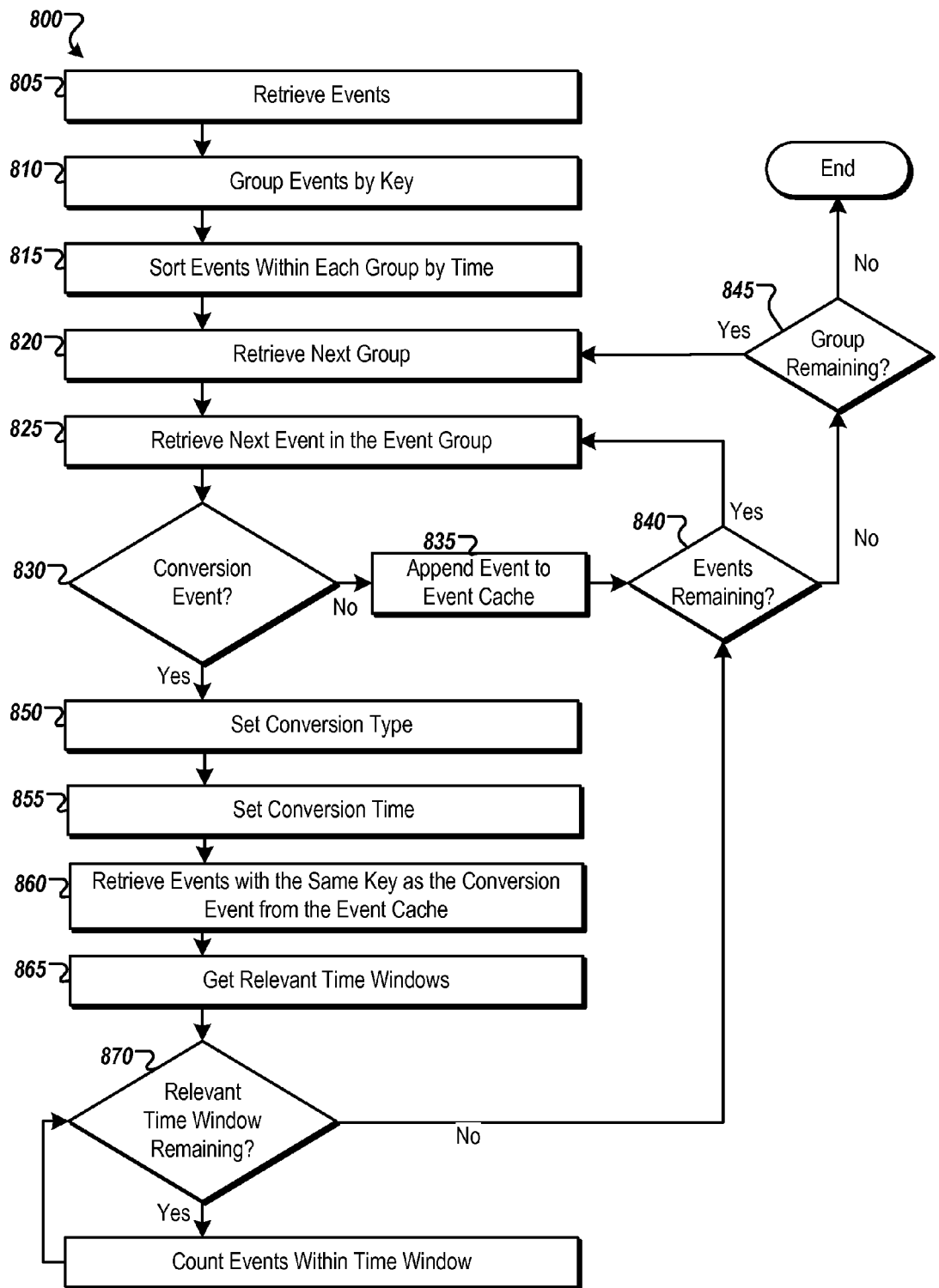
FIG. 8 is an alternative example of a process of determining time window counts.

FIGS. 6, 7, and 8 are flow charts of example processes 600, 700, and 800, respectively, for conversion crediting. The processes 600, 700, and 800 may be performed, for example, by a system such as the system 505, and, for clarity of presentation, the description that follows uses the system 505 and conceptual diagram 100 as the basis of an example for describing the processes. However, another system, or combination of systems, may be used to perform the processes 600, 700, and 800.

FIG. 6 is an example process 600 of conversion crediting. The process 600 can involve one or more stages (i.e., groupings of process steps) as shown in FIG. 6. The stages can include preprocessing, time window count computation (referred to as Stage 1 in FIG. 6), and credit determination stages (shown as Stage 2 in FIG. 6). Separating the process 600 into stages may allow greater flexibility and scalability in the conversion crediting process. For example, time window counts can be computed separately from other parts of the process such as selecting weighting models. This separation may permit users to change weighting models without having to recalculate the time window counts. Thus, a user can generate and compare multiple conversion crediting scenarios without having to reprocess potentially large data sets. It should be noted that the stages shown in FIG. 6 are merely illustrative. Additional or fewer stages may be used, or stages may not be used at all.

The process 600 begins by identifying events (605). For example, events may be obtained from the event repository 525 by the sorting/filtering module 540, among other elements of the system 505. In some cases, events may be received from a remote computer such as the remote server 565.

The process 600 sorts the identified events (610). For example, the sorting module 540 may divide events into groups according to a key. In some cases, events may be further sorted in chronological order.

The process identifies one or more time windows (615). For instance, a modeling module 550 may select time windows based on a rate of change of the likelihood that an advertisement will result in a conversion. In some cases, a time window may be selected based upon a time-to-conversion profile for an advertisement. For example, the modeling module 550 may select one or more time windows such that the time windows can sufficiently sample a time-to-conversion profile. For instance, in areas where a slope of a time-to-conversion profile is relatively steep, the selected time windows may have a shorter duration. However, where a slope of a time-to-conversion profile changes more gradually, the selected time windows may be of greater duration.

The process 600 determines window counts (620). In some implementations, a statistics module 545 may count a number of advertising-related events within a specified time window and store this number in the window database 520.

The process selects a weighting model (625). For example, the modeling module 550 may select a weighting model such as the model illustrated in equation (1). The process also calculates a credit (630). For example, the modeling module 550 may calculate a credit for an advertisement according to formula (2) above.

FIG. 7 is an example process 700 of determining time window counts. In some cases, the process 700 can be used to determine time window counts in real time. The process 700 reads a next event (705). For example, the sorting module 540 can read an event from an event repository 525, memory 515, or an event can be transmitted from a remote computing device 565.

The process 700 determines whether an event is a conversion event (710). For example, the sorting module 540 may review an event identifier for an event to determine whether the event is a conversion. The process 700 appends non-conversion events to an event cache (715). In some case, the sorting module 540 may append non-conversion events to an event cache (e.g., a data structure such an array) stored in memory 515 or other data repository. After appending a non-conversion event to the event cache (715), the process 700 reads the next event (705) if there are any events remaining at (745) or the process 700 ends if there are no events remaining. For example, as described above, the sorting module 540 can read the next event from an event repository or, if there are no events remaining, the process 700 may exit.

If the event is a conversion, the process 700 sets a conversion time (720) and conversion type (725). For example, the sorting module 540 can read a conversion event's timestamp and set a transaction time associated with the conversion equal to the timestamp. Similarly, the sorting module 540 can read a conversion event's event identifier and set a transaction type associated with the conversion equal to the event identifier.

The process 700 retrieves events with the same key as the conversion event (730) and optionally deletes retrieved events from the event cache (735). For example, the sorting module 540 may retrieve events with the same key from an event repository 525, event cache stored in memory 515, or a remote computing device 565. The retrieved events may be considered to be in the same transaction as the conversion event. The sorting module 540 may also delete retrieved events from the event cache.

The process 700 retrieves relevant time windows (750). For example, the modeling module 550 can retrieve time windows before the conversion event from the window repository 520. If the process 700 determines that any relevant time windows remain (755), the process 700 counts events within a time window (760). For example, the statistics module 545 may determine if any events remain and count events within the specified time window. In some cases, the process 700 keeps counters for each pair of event identifier and window size.

The process 700 determines if any events remain (745). If there are events remaining, the process 700 may read the next event (705); if not, the process 700 may end. For example, the sorting module 540 can determine if there are events remaining and read the next event if there is one available. If not, the process can end.

FIG. 8 is an alternative example of a process 800 of determining time window counts. In some implementations, the illustrative process 800 may be used to determine time window counts offline. The process 800 retrieves events (805). For example, the sorting module 540 retrieves events from an event repository 525, memory 515, or a remote computer 565. The process 800 groups events by key (810) and sorts the events by time (815). For example, in some cases the sorting module 540 may group events by key and sort events by time. The process may retrieve the next group (820). For example, the sorting module 540 may retrieve groups from a repository or database such as the event repository 525, memory 515, or a remote computer 565. The process 800 retrieves the next event in the event group (825). For example, the sorting module 540 may retrieve the next event in the event group from an event repository 525.

The process 800 determines whether an event is a conversion event (830). For example, the sorting module 540 can read an event identifier for an event to determine whether the identifier is a conversion identifier. If not, the process 800 adds the event to an event cache (835). For instance, the sorting module 540 can add the event to an event cache stored in memory 515 or another database. Depending on whether the process 800 determines that another event remains (840), the process 800 either retrieves the next event in the event group (825) or the process determines whether another group remains (845). For example, the sorting module 540 can determine whether another event remains and retrieve the next event in the event group. Or, if no other event remains, the sorting module 540 can determine whether another group remains by, for example, examining an event repository 525 or other database.

If the event is a conversion event, the process 800 sets a conversion type (850) and conversion time (855). For example, the sorting module 540 can read a conversion event's event identifier and set a transaction type associated with the conversion equal to the event identifier. Similarly, the sorting module 540 can read conversion event's timestamp and set a transaction time associated with the conversion event equal to the timestamp.

The process 800 retrieves events with the same key as the conversion event from the event cache (860). For example, the sorting module 540 can retrieve events with the same key as the conversion event from the event cache. The process 800 can retrieve relevant time windows (865). For example, the modeling module 550 can retrieve time windows before the conversion event from window repository 520 or memory 515. If the process 800 determines that any relevant time windows remain (870), the process can count events within a time window (875). For example, the statistics module 545 can count the events within a time window. If no relevant time windows remain, the process 800 may determine whether there are any events left to process (840). For example, the sorting module 540 may determine if any events remain. If there are events remaining, the process 800 retrieves the next event in the event group (825) as described above. If not, the process 800 determines whether any groups are remaining (840) in the manner described above. If so, as discussed above, the process 800 retrieves the next group (820); if not, the process 800 ends.

Figure 9:
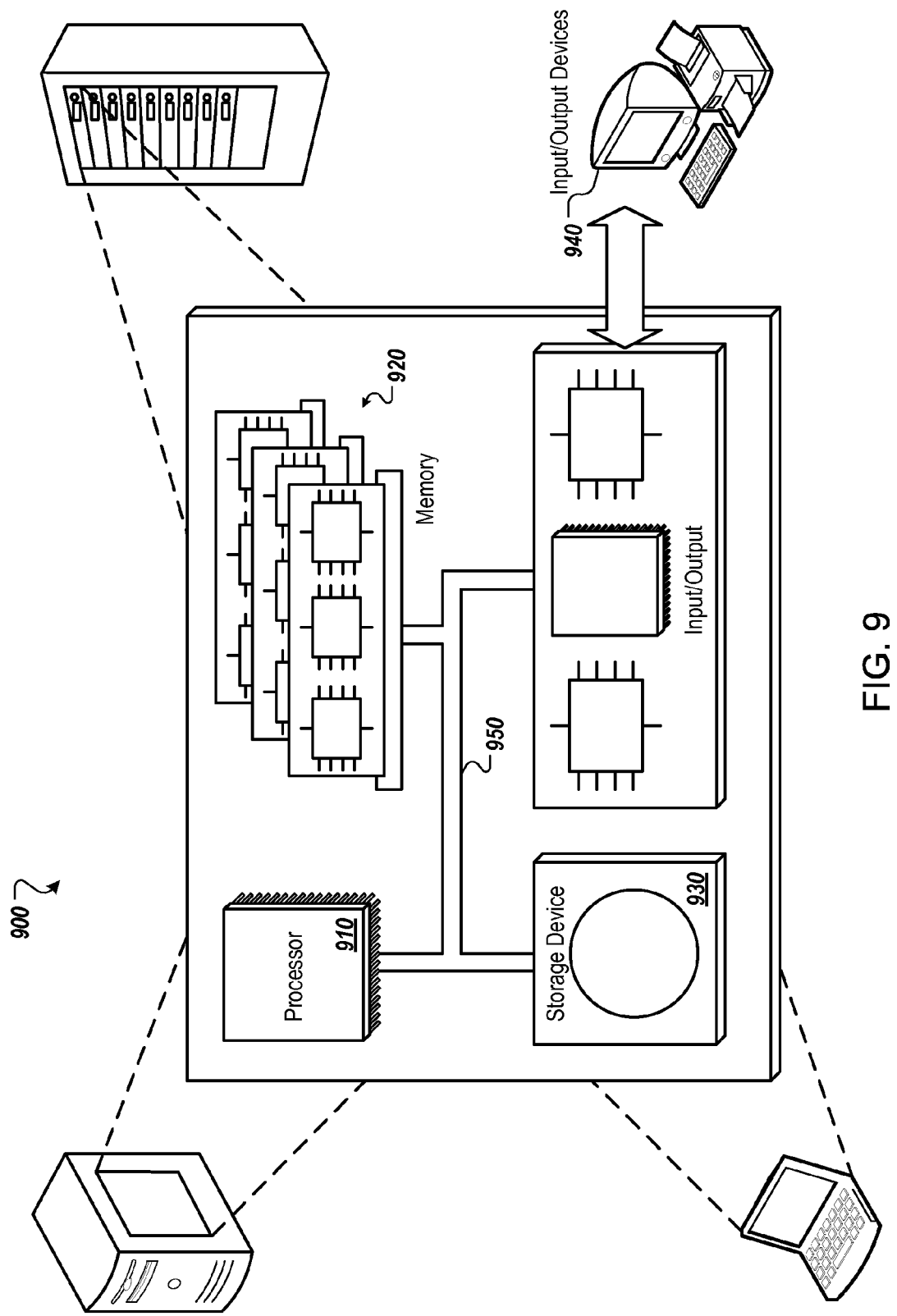
FIG. 9 is an example schematic diagram of a computer system for conversion crediting.

FIG. 9 is an example schematic diagram of a computer system for conversion crediting. The system 900 can be used for the operations described in association with any of the computer-implemented techniques and systems described previously, according to various implementations. For example, the system 900 can be used to implement the processes described in FIGS. 6-8. The system 900 includes one or more processors 910, a memory 920, a storage device 930, and an input/output device 940. Each of the components 910, 920, 930, and 940 are interconnected using a system bus 950. The processor 910 is capable of processing instructions for execution within the system 900. The processor 910 is a single-threaded or multi-threaded processor having one or more processor cores. The processor 910 is capable of processing instructions stored in the memory 920 or on the storage device 930 to display graphical information for a user interface on the input/output device 940.

The memory 920 stores data in the system 900. For example, the memory 920 can be used to store weighting model, events, window sizes, etc. The storage device 930 is capable of providing storage for the system 900. In one implementation, the storage device 930 is a computer-readable medium. In various different implementations, the storage device 930 can be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can in various implementations be performed by, and apparatus can in various implementations be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what can be claimed, but rather as descriptions of features specific to particular embodiments of the invention. Certain features that are described in this specification in the context of separate embodiments can in various implementations be implemented in combination in a single embodiment. Conversely, various features that are described in the context of a single embodiment can in various implementations be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
   identifying, by one or more computers, user interactions with a particular advertisement;
   identifying, by the one or more computers, multiple conversion events associated with the particular advertisement, each identified conversion event corresponding to one of the user interactions, wherein the identified conversion event is a predefined interaction with a resource;
   identifying, by the one or more computers and for each of the identified multiple conversion events, a conversion time that specifies an amount of time elapsed between the identified conversion event and the user interaction to which the identified conversion event corresponds;
   generating, by the one or more computers, a time-to-conversion profile for the particular advertisement based on the identified user interactions, the identified multiple conversion events, and each conversion time, wherein the time-to-conversion profile indicates a likelihood of a conversion event at multiple different amounts of time elapsed after a user interaction associated with the particular advertisement;

determining, by the one or more computers and based on the time-to-conversion profile, multiple different conversion time windows having sizes that are based on different slopes of the time-to-conversion profile, wherein a first time window determined for a first portion of the time-to-conversion profile having a first slope is smaller than a second time window for a second portion of the time-to-conversion profile having a second slope that is less than the first slope; and outputting, by the one or more computers, data that graphically present the time-to-conversion profile to a provider of the particular advertisement in a reporting interface.

2. The method of claim 1, wherein generating, by the one or more computers, a time-to-conversion profile for the particular advertisement based on the identified user interactions, the identified conversion events, and each conversion time comprises:

for each of a plurality of time intervals, dividing a number of times an identified user interaction occurred before a corresponding identified conversion event in the time interval by an average number of user interaction occurrences in the time interval.

3. The method of claim 1, further comprising:

determining, for each given time window among the multiple different conversion time windows, a corresponding time window count by determining a number of the identified user interactions occurring within the given time window and before the corresponding identified conversion event;

selecting a weighting factor for each given time window;

generating, for each given time window, a weighted time window count based on a function of each of the corresponding time window counts and the weighting factor for the given time window, the weighted time window count indicating a value of the identified user interactions that occurred within the given time window relative to the identified user interactions occurring in the other ones of the multiple different time windows; and determining an advertisement credit for the particular advertisement based at least in part on the weighted time window counts for each given time window, the advertisement credit indicating a strength of an association between the particular advertisement and the identified conversion events.

4. The method of claim 3, further comprising:

generating a normalized credit by multiplying the credit by a normalization factor, the normalization factor being such that a sum of normalized credits equals a total number of conversion events.

5. The method of claim 4, further comprising:

determining a cost effectiveness of the advertisement by dividing a cost of the advertisement by the normalized credit for the advertisement.

6. A system, comprising:

a data processing apparatus; and a data store storing instructions that, when executed by the data processing apparatus, cause the data processing apparatus to perform operations comprising:

identifying user interactions with a particular advertisement;

identifying multiple conversion events associated with the particular advertisement, each identified conversion event corresponding to one of the user interactions, wherein the identified conversion event is a predefined interaction with a resource;

identifying, for each of the identified multiple conversion events, a conversion time that specifies an amount of time elapsed between the identified conversion event and the user interaction to which the identified conversion event corresponds;

generating a time-to-conversion profile for the particular advertisement based on the identified user interactions, the identified conversion events, and each conversion time, wherein the time-to-conversion profile indicates a likelihood of a conversion event at multiple different amounts of time elapsed after a user interaction associated with the particular advertisement;

determining, based on the time-to-conversion profile, multiple different conversion time windows having sizes that are based on different slopes of the time-to-conversion profile, wherein a first time window determined for a first portion of the time-to-conversion profile having a first slope is smaller than a second time window for a second portion of the time-to-conversion profile having a second slope that is less than the first slope; and outputting, by the one or more computers, data that graphically present the time-to-conversion profile to a provider of the particular advertisement in a reporting interface.

7. The system of claim 6, wherein generating a time-to-conversion profile for the particular advertisement based on the identified user interactions, the identified conversion events, and each conversion time comprises:

for each of a plurality of time intervals, dividing a number of times an identified user interaction occurred before a corresponding identified conversion event in the time interval by an average number of user interaction occurrences in the time interval.

8. The system of claim 6, wherein the operations further comprise:

determining, for each given time window among the multiple different time windows, a corresponding time window count by determining a number of the identified user interactions occurring within the given time window and before the corresponding identified conversion event;

selecting a weighting factor for each given time window;

generating, for each given time window, a weighted time window count based on a function of each of the corresponding time window counts and the weighting factor for the given time window, the weighted time window count indicating a value of the identified user interactions that occurred within the given time window relative to the identified user interactions occurring in the other ones of the multiple different time windows; and determining an advertisement credit for the particular advertisement based at least in part on the weighted time window counts for each given time window, the advertisement credit indicating a strength of an association between the particular advertisement and the identified conversion events.

9. The system of claim 8, wherein the operations further comprise:

generating a normalized credit by multiplying the credit by a normalization factor, the normalization factor being such that a sum of normalized credits equals a total number of conversion events.

10. The system of claim 9, wherein the operations further comprise:

determining a cost effectiveness of the advertisement by dividing a cost of the advertisement by the normalized credit for the advertisement.

11. A non-transitory computer readable medium comprising instructions that, when executed by data processing apparatus, cause the data processing apparatus to perform operations comprising:

identifying user interactions with a particular advertisement;

identifying multiple conversion events associated with the particular advertisement, each identified multiple conversion event corresponding to one of the user interactions, wherein the identified conversion event is a predefined interaction with a resource;

identifying, for each of the identified conversion events, a conversion time that specifies an amount of time elapsed between the identified conversion event and the user interaction to which the identified conversion event corresponds;

generating a time-to-conversion profile for the particular advertisement based on the identified user interactions, the identified multiple conversion events, and each conversion time, wherein the time-to-conversion profile indicates a likelihood of a conversion event at multiple different amounts of time elapsed after a user interaction associated with the particular advertisement;

determining, based on the time-to-conversion profile, multiple different conversion time windows having sizes that are based on different slopes of the time-to-conversion profile, wherein a first time window determined for a first portion of the time-to-conversion profile having a first slope is smaller than a second time window for a second portion of the time-to-conversion profile having a second slope that is less than the first slope; and outputting, by the one or more computers, data that graphically present the time-to-conversion profile to a provider of the particular advertisement in a reporting interface.

12. The non-transitory computer readable medium of claim 11, wherein generating a time-to-conversion profile for the particular advertisement based on the identified user interactions, the identified conversion events, and each conversion time comprises:

for each of a plurality of time intervals, dividing a number of times an identified user interaction occurred before a corresponding identified conversion event in the time interval by an average number of user interaction occurrences in the time interval.

13. The non-transitory computer readable medium of claim 11, wherein the operations further comprise:

determining, for each given time window among the multiple different conversion time windows, a corresponding time window count by determining a number of the identified user interactions occurring within the given time window and before the corresponding identified conversion event;

selecting a weighting factor for each given time window;

generating, for each given time window, a weighted time window count based on a function of each of the corresponding time window counts and the weighting factor for the given time window, the weighted time window count indicating a value of the identified user interactions that occurred within the time window relative to the identified user interactions occurring in the other ones of the multiple different time windows; and determining an advertisement credit for the particular advertisement based at least in part on the weighted time window counts for each given time window, the advertisement credit indicating a strength of an association between the particular advertisement and the identified conversion events.

14. The non-transitory computer readable medium of claim 13, wherein the operations further comprise:

generating a normalized credit by multiplying the credit by a normalization factor, the normalization factor being such that a sum of normalized credits equals a total number of conversion events.

\* \* \* \* \*

UNITED STATES PATENT AND TRADEMARK OFFICE
CERTIFICATE OF CORRECTION

PATENT NO. : 10,438,233 B2  
APPLICATION NO. : 13/963108  
DATED : October 8, 2019  
INVENTOR(S) : Ma et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1684 days.

Signed and Sealed this
Thirtieth Day of June, 2020

Andrei Iancu
*Director of the United States Patent and Trademark Office*